(12) United States Patent  (10) Patent No.: US 8,206,068 B2
Takashima et al.  (45) Date of Patent: Jun. 26, 2012

(54) MAIN SPINDLE DEVICE

(75) Inventors: Toshiharu Takashima, Kariya (JP); Yuji Okawa, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 716 days.

(21) Appl. No.: 12/424,932

(22) Filed: Apr. 16, 2009

(65) Prior Publication Data

US 2009/0263202 A1 Oct. 22, 2009

(30) Foreign Application Priority Data

Apr. 18, 2008 (JP) ................................. 2008-108825

(51) Int. Cl.
 *B23Q 11/08* (2006.01)
(52) U.S. Cl. ........................................ 409/136; 409/231
(58) Field of Classification Search .......... 409/135–136, 409/231, 233; 408/61; 184/6.14; 277/412, 277/418–421, 347–349; *B23Q 11/00, 11/08*
 See application file for complete search history.

(56) References Cited

U.S. PATENT DOCUMENTS

| 5,228,700 A | * | 7/1993 | Biesold et al. ................ 277/421 |
| 5,274,286 A |   | 12/1993 | Yamamura |
| 5,655,862 A | * | 8/1997 | Kato ............................. 409/231 |
| 6,123,270 A | * | 9/2000 | Hara ................................ 239/8 |

FOREIGN PATENT DOCUMENTS

| DE | 3838786 A | * | 8/1989 |
| GB | 2266937 A | * | 11/1993 |
| JP | 6-206103 |   | 7/1994 |
| JP | 08085004 A | * | 4/1996 |
| JP | 11099436 A | * | 4/1999 |
| JP | 2000-18395 |   | 1/2000 |
| JP | 2002263982 A | * | 9/2002 |
| JP | 2006-43883 |   | 2/2006 |
| JP | 2006-125554 |   | 5/2006 |

OTHER PUBLICATIONS

U.S. Appl. No. 12/424,925, filed Apr. 16, 2009, Takashima, et al.

* cited by examiner

*Primary Examiner* — Daniel Howell
(74) *Attorney, Agent, or Firm* — Oblon, Spivak, McClelland, Maier & Neustadt, L.L.P.

(57) ABSTRACT

In a main spindle device provided with a housing and a main spindle, a labyrinth-forming annular groove is formed, in the circumferential direction of the main spindle, on the outer circumferential surface of a protruding portion of the spindle that protrudes from the housing on the front side. A housing lid member having a protruding portion that is inserted into the labyrinth-forming annular groove so as not to contact an inside surface of the labyrinth-forming annular groove all around the periphery is fixed to the housing on the front side thereof and forms a labyrinth seal portion between the protruding portion and the labyrinth-forming annular groove. The housing lid member is constructed so that the housing lid member can be divided into at least two pieces with respect to the circumference of the labyrinth-forming annular groove.

7 Claims, 5 Drawing Sheets

MAIN SPINDLE DEVICE

INCORPORATION BY REFERENCE

The disclosure of Japanese Patent Application No. 2008-108825 filed on Apr. 18, 2008 including the specification, drawings and abstract is incorporated herein by reference in its entirety.

BACKGROUND OF THE INVENTION

1. Field of the Invention

The invention relates to a main spindle device for a machine tool, and in particular, to a labyrinth-like complex labyrinth seal structure that is formed between a main spindle and a housing.

2. Description of the Related Art

A main spindle used in a main spindle device of a machine tool is inserted into a housing, and supported by a bearing so as to be able to rotate relative to the housing. A tool, a workpiece, or the like is held at the tip of the main spindle to perform machining, and in general, machining is performed while spraying coolant etc. (cutting fluid etc.) onto the tool, the workpiece, or the like, for the purpose of preventing seizure at the machined portion, improving the plane accuracy, etc. However, coolant, foreign matter (chips), etc. can easily pass through the gap between the housing and the main spindle and reach the bearing. When the coolant etc. reach the bearing, there is a possibility that seizure of the bearing occurs. For this reason, various types of sealing structures have been used to prevent the coolant, foreign matter, etc. from entering through the gap between the housing and the main spindle and reaching the bearing, and in general, air sealing is used.

For example, a conventional main spindle device 101 using an air sealing structure shown in FIGS. 4A, 4B and 5 is provided with a non-contact, air sealing structure that effects sealing by discharging compressed air (hereinafter referred to as "air") through a gap between a housing, which includes a housing body 20 and a bearing holding lid member 130, and a main spindle 110. FIG. 4A shows a sectional view taken along the plane including the rotation axis ZT of the main spindle 110 (note that a tool T and a tool holder H are not shown in section). FIG. 4B shows a diagram when viewed from the direction indicated by the arrow BB with the tool T and the tool holder H omitted from FIG. 4A. FIG. 5 is an enlarged view of the AS1 portion in FIG. 4A. As shown in FIG. 4A, the tool T is fitted to the tool holder H, which is in turn fitted to a tip portion of the main spindle 110. The main spindle 110 is inserted into the housing, which includes the housing body 20 and the bearing holding lid member 130, and supported by a bearing J so as to be able to rotate about the rotation axis ZT relative to the housing body 20.

The bearing holding lid member 130 in which a hole is formed, into which the main spindle 110 can be inserted, is fitted into the housing body 20 along the direction of the rotation axis ZT, and the air sealing structure is formed between the inner circumferential surface of the bearing holding lid member 130 and the outer circumferential surface of the main spindle 110. As shown in FIG. 5, which is an enlarged view of the AS1 portion in FIG. 4A, a first annular groove M1, a second annular groove M2, and a third annular groove M3 are formed on an outer circumferential surface of the main spindle 110 in the circumferential direction. On part of an inner circumferential surface of the bearing holding lid member 130 that faces the first annular groove M1, an inner-side air receiving groove MA is formed in the circumferential direction. On part of the inner circumferential surface of the bearing holding lid member 130 that faces the second annular groove M2, an inner-side air receiving groove MB is formed in the circumferential direction. On part of the inner circumferential surface of the bearing holding lid member 130 that faces the third annular groove M3, an inner-side air receiving groove MC is formed in the circumferential direction. An air receiving area AK1 is created by the first annular groove M1 and the inner-side air receiving groove MA, a collection space AK2 is created by the second annular groove M2 and the inner-side air receiving groove MB, and an air receiving area AK3 is created by the third annular groove M3 and the inner-side air receiving groove MC. The air supplied from the air supply source (not shown) is distributed to air supply passages AL1 and AL2 and supplied to the first annular groove M1 (air receiving area AK1) and the third annular groove M3 (air receiving area AK3). The air supplied to the air receiving area AK1 is discharged through air sealing gaps AG1 and AG2 to effect air sealing, and the air supplied to the air receiving area AK3 is discharged through air sealing gaps AG3 and AG4 to effect air sealing. In case that coolant etc. pass through the air sealing gaps AG1 and AG2, a discharging passage DL for discharging the entered coolant etc. is formed in a lower portion of the inner circumferential surface of the housing that faces the collection space AK2, whereby the entrance of coolant etc. into the bearing J is prevented.

As the related art described in Japanese Patent Application Publication No. 2006-043883 (JP-A-2006-043883), a main spindle end sealing structure for a machine tool is disclosed, in which a substantially annular inner sealing member is fitted onto a main spindle, a substantially annular outer sealing member is fitted into a housing, a labyrinth seal portion is formed between the inner sealing member and the outer sealing member, and the end face of the inner sealing member and the outer sealing member is covered with a lid member. As the related art described in Japanese Patent Application Publication No. 2006-125554 (JP-A-2006-125554), a non-contact sealing structure for a rotary shaft is disclosed, in which the end face of the tip portion of a housing is covered with a lid member, an annular sealing member is attached to a main spindle so as to cover part of a radially inner portion of the lid member, and a gap is created by the sealing member, the lid member, and the tip portion of the housing, the gap including a complex narrow portion and an air receiving area.

Cutting fluid, such as coolant, is used at higher pressure in recent years, and as a result, there is a case where the cutting fluid splashes back with momentum greater than that a conventional air sealing can resist. In the case of the related art shown in FIGS. 4 and 5, when coolant or the like vigorously splashes back toward the gap between the main spindle 110 and the housing in the direction of the rotation axis ZT, there is a possibility that such coolant can enter deep inside because the gap between the main spindle 110 and the housing does not have a complex shape, that is, it is straight. In the case of the related art described in JP-A-2006-043883 and JP-A-2006-125554, although the gap between the main spindle and the housing has a complex shape, it is necessary to fit (install) a sealing member onto a main spindle that rotates, and therefore, it is troublesome to adjust the rotation balance of the main spindle. Note that because it is difficult to integrally form the main spindle and the sealing portion that protrudes in the radial direction of the main spindle, a separate annular sealing member is fitted onto the main spindle in the devices described in JP-A-2006-0438883 and JP-A-2006-125554.

SUMMARY OF THE INVENTION

The invention provides a main spindle device, in which without fitting a sealing member onto a main spindle, a labyrinth-like complex labyrinth seal portion is formed between the main spindle and the housing, so that it is possible to more effectively suppress the entrance of cutting fluid, such as coolant, into the gap between the main spindle and the housing.

A main spindle device according to an aspect of the invention includes: a housing; a main spindle that is inserted into the housing and supported by a bearing so as to be able to rotate relative to the housing, wherein a labyrinth-forming annular groove is formed, in the circumferential direction of the main spindle, on a protruding portion of the main spindle that protrudes from the housing on the front side along the rotation axis of the main spindle; and a housing lid member having a convex portion that is inserted, along the radial direction of the main spindle, into the labyrinth-forming annular groove so as not to contact an inside surface of the labyrinth-forming annular groove all around the periphery, the housing lid member being fixed to the housing on the front side thereof with the convex portion being inserted in the labyrinth-forming annular groove, wherein a gap between the convex portion and the labyrinth-forming annular groove forms a labyrinth seal portion, and the housing lid member is constructed so that the housing lid member can be divided into at least two pieces with respect to a circumference of the labyrinth-forming annular groove.

With the main spindle device with this configuration, the labyrinth seal portion is obtained by forming the labyrinth-forming annular groove on the main spindle without fitting a separate sealing member onto the main spindle. While it is difficult to integrally form the main spindle and the sealing portion that protrudes in the radial direction of the main spindle, it is easy to form a groove on the main spindle. In order to allow the labyrinth-forming annular groove to form a labyrinth-like complex gap, it is necessary to insert the convex portion into the labyrinth-forming annular groove along the radial direction of the main spindle. Thus, the housing lid member is divided into at least two pieces, which are inserted into the groove along the radial direction. In this way, it is possible to form the labyrinth-like complex labyrinth seal portion between the main spindle and the housing to reduce the momentum and the amount of coolant or the like without fitting a sealing member onto the main spindle, whereby it is possible to further suppress the entrance of coolant etc.

In the main spindle device of the above aspect, the rotation axis of the main spindle may be oriented in the horizontal direction or in the direction inclined relative to the vertical direction by a predetermined angle, and a division line of the housing lid member that is constructed so that the housing lid member can be divided into at least two pieces, may be inclined downward from the radially inner side to the radially outer side of the housing lid member when the housing lid member is fixed to the housing.

According to the main spindle device with this configuration, in order to prevent coolant or the like that permeates the divided housing lid member at the division line from reaching the gap between the main spindle and the housing, the division line is set so that the division line is inclined downward from the radially inner side to the radially outer side of the housing lid member. In this way, it is possible to more effectively suppress the entrance of cutting fluid, such as coolant, into the gap between the main spindle and the housing.

In the main spindle device of the above aspect, a discharging passage that discharges fluid and foreign matter that enter through the gap between the housing and the main spindle may be formed in a lower portion of the housing on the rear side of the labyrinth seal portion that is opposite to the front side thereof.

With the main spindle device with the above configuration, coolant or the like can be discharged through the discharging passage even when coolant or the like enters beyond the labyrinth seal portion.

The main spindle device of the above aspect may be configured such that a collection space that is a space greater in size than a gap of the labyrinth seal portion is created along the outer circumferential surface of the main spindle in the rear side of the labyrinth seal portion, wherein the discharging passage is connected to the collection space.

With the main spindle device with the above configuration, coolant or the like can be discharged from the collection space through the discharging passage even when coolant or the like enters beyond the labyrinth seal portion.

In the main spindle device of the above aspect, the outer circumferential surface of the main spindle defining the collection space may be inclined so that the diameter of the main spindle increases from the rear side to the front side.

According to the main spindle device with this configuration, coolant or the like that enters the collection space and is on the outer circumferential surface of the rotating main spindle is moved, due to the centrifugal force, in the direction in which the diameter of the main spindle increases. In this case, coolant or the like is moved in the direction from the rear side to the front side that is inverse to the direction in which coolant or the like enters. Thus, it is possible to prevent the coolant or the like that enters the collection space from entering deeper.

The main spindle device of the above aspect may be configured such that: the main spindle device further includes a coolant nozzle that sprays coolant; a housing hole that houses the coolant nozzle so as not for the coolant nozzle to protrude from the housing is formed, corresponding to the coolant nozzle, in a front end portion of the housing, on which the housing lid member fixed to the housing abuts the housing, from the front side toward the rear side; and an opening is formed in the housing lid member at a position corresponding to the housing hole.

According to the main spindle device with this configuration, when the divided housing lid member is installed along the radial direction of the main spindle, the housing lid member is easily installed because there is no interference with the coolant nozzle.

In the main spindle device of the above aspect, the housing may have an air supply passage therein to which an air supply source is connected; a first annular groove, a second annular groove, and a third annular groove may be formed, in the circumferential direction of the main spindle, on the outer circumferential surface of the main spindle from the rear side of the labyrinth seal portion to the front side of the bearing, the first to third annular grooves being arranged in parallel in this order from the front side to the rear side in the labyrinth seal portion; and the first annular groove and the third annular groove may be connected to the air supply passage. In addition, the main spindle device may be provided with a non-contact air sealing portion, in which air supplied through the air supply passage is discharged into an air sealing gap that is defined by the outer circumferential surface of the main spindle on both the front side and the rear side of the first annular groove and by the corresponding inner circumferential surface of the housing that faces the outer circumferential surface of the main spindle and into an air sealing gap that is defined by the outer circumferential surface of the main spindle on both the front side and the rear side of the third annular groove and by the corresponding inner circumferential surface of the housing that faces the outer circumferential surface of the main spindle.

The main spindle device with this configuration includes, between the main spindle and the housing between the labyrinth seal portion and the bearing, the air sealing portion in which air is discharged from the first annular groove and the air sealing portion in which air is discharged from the third annular groove. Thus, it is possible to more properly suppress the entrance of coolant etc. to the bearing.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1A:
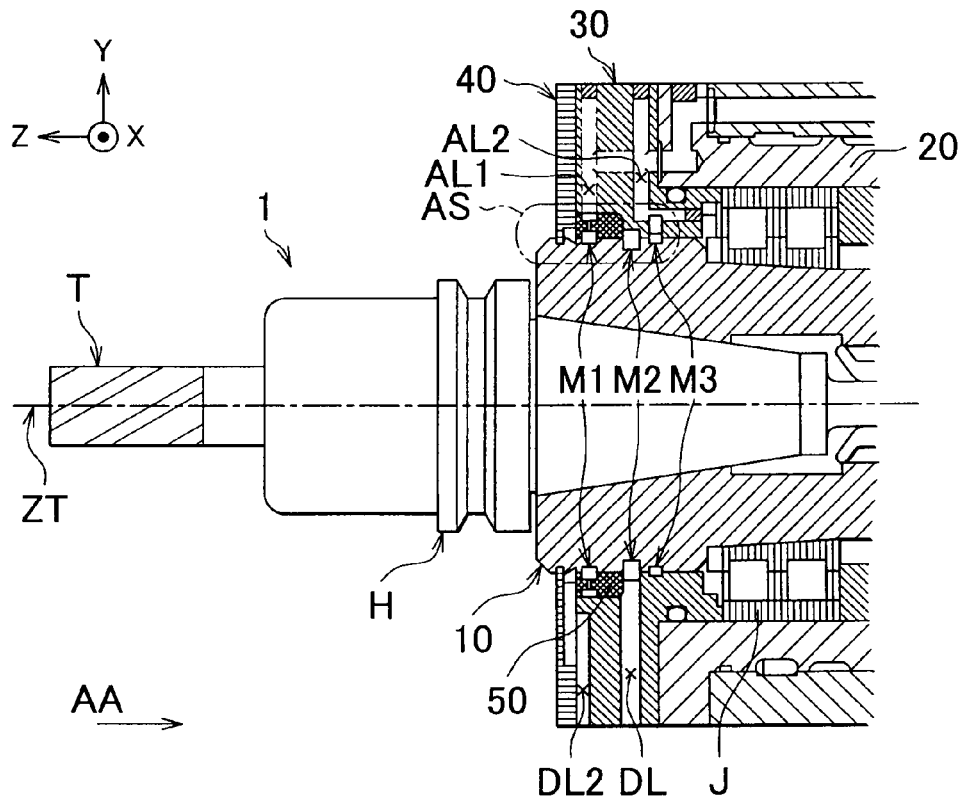
FIG. 1A is a sectional view for explaining a structure of an embodiment of a spindle device 1 of the invention.
Figure 1B:
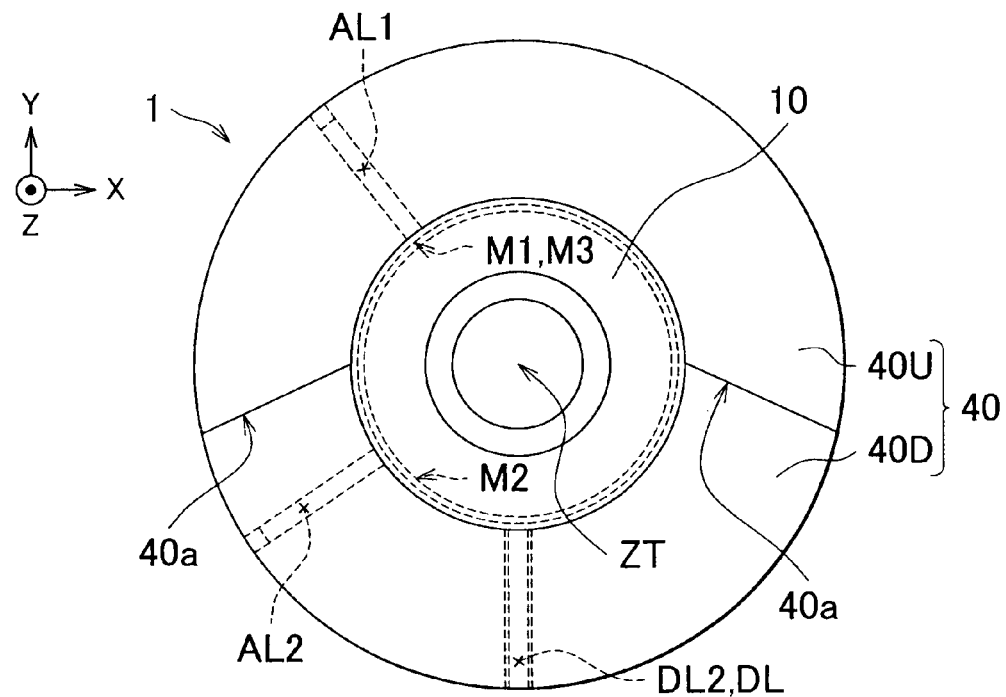
FIG. 1B is a front view for explaining the structure of the embodiment of the spindle device 1 of the invention.

An example embodiment for carrying out the invention will be described below with reference to drawings. FIG. 1A shows an example of a sectional side view of a main spindle device 1 of the invention. FIG. 1B shows an example of a diagram (front view) when viewed from the direction indicated by the arrow AA in FIG. 1A. FIG. 1A shows a sectional view taken along the plane including the rotation axis ZT of a main spindle 10 (note that a tool T and a tool holder H are not shown in section). In FIG. 1B, the tool T and the tool holder H are omitted. In all the figures, the X, Y, and Z axes are orthogonal to each other. The axis Y represents the vertical direction, and the X and Z axes represent horizontal directions, where the Z axis represents the direction along the rotation axis ZT of the main spindle 10.

(Overall Structure of Spindle Device)

As shown in FIG. 1A, the main spindle device 1 of this embodiment includes: a housing (in this embodiment, the housing includes a housing body 20 and a bearing holding lid member 30) provided with air supply passages AL1 and AL2; and the main spindle 10 that is inserted into the housing and supported by a bearing J so as to be able to rotate about the rotation axis ZT relative to the housing. The air supply passages AL1 and AL2 are connected to an air supply source (not shown) and supplied with air. The tool T (end mill in the example shown in FIG. 1) is fitted to the tool holder H. The tool holder H is fitted to a front-side tip portion of the main spindle 10 (so that the tool holder H can be replaced). Note that the "front" herein means the direction from the bearing side to the tool side along the rotation axis ZT, that is, the direction of Z axis, or the left, in FIG. 1, for example. Moreover, the "air sealing" herein means non-contact sealing achieved via air.

The substantially annular bearing J is fitted into the inner wall of the housing body 20 in the direction of the rotation axis ZT (from the left in FIG. 1A). In addition, the bearing holding lid member 30 that holds the bearing J in the direction of the rotation axis ZT is fitted into the housing body 20 in the direction of the rotation axis ZT (from the left in FIG. 1A). A hole, through which the main spindle 10 can be inserted, is formed in the bearing holding lid member 30. A substantially annular air sealing member 50 is detachably fixed to the bearing holding lid member 30 along the direction of the rotation axis ZT (from the left in FIG. 1A). For example, the air sealing member 50 is fixed to the bearing holding lid member 30 by transition fit, which is advantageous in ease of removal and in the small amount of air leak, or by bolts, which significantly facilitate detachment of the air sealing member 50. Note that the air sealing member 50 is fixed after performing an adjustment so that the gap between the inner circumferential surface of the air sealing member 50 and the outer circumferential surface of the main spindle 10 becomes substantially even all around the perimeter. Then, the main spindle 10 is inserted into the housing (including the housing body 20 and the bearing holding lid member 30) and the bearing J in the direction of the rotation axis ZT (from the left in FIG. 1A). In addition, a housing lid member 40 provided with a hole, through which the main spindle 10 is inserted, is attached so that the housing lid member 40 covers the front-side face of the bearing holding lid member 30 and the air sealing member 50. The housing lid member 40 is divided into an upper housing lid member 40U and a lower housing lid member 40D at a division line 40a in the example shown in FIG. 1B. In the bearing holding lid member 30 (that is, the housing), a discharging passage DL for discharging coolant and/or foreign matter that enters through the gap between the housing and the main spindle 10 is formed. In addition, a discharging passage DL2 is formed at the interface portion between the housing lid member 40 and the bearing holding lid member 30 on the front side with respect to the discharging passage DL.

(Detail of Air Sealing Structure Portion)

Figure 2:
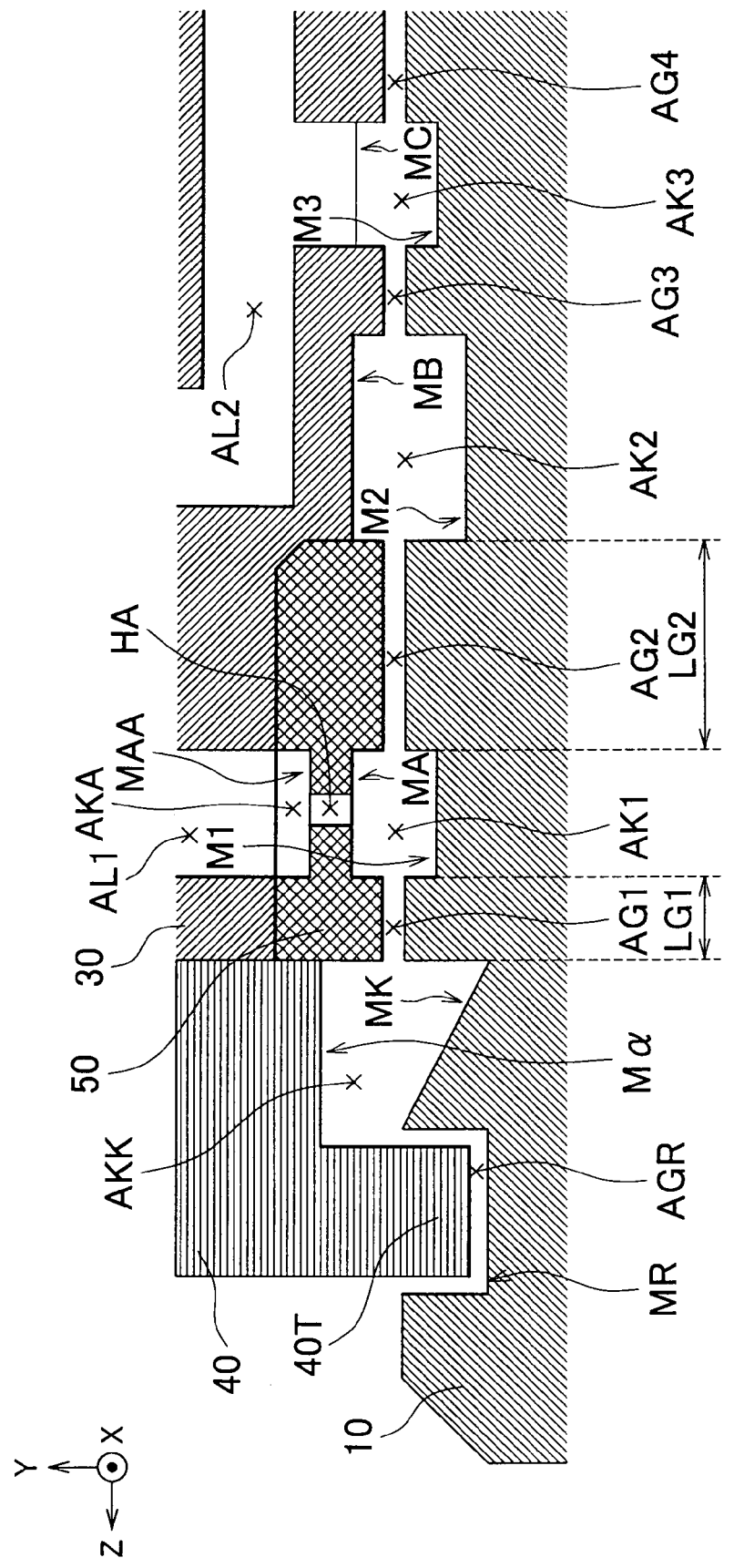
FIG. 2 is an enlarged view of the AS portion in FIG. 1A.

In the spindle device 1, air (compressed air) is supplied from the air supply source through the air supply passages AL1 and AL2 and the supplied air is discharged through the gap between the outer circumferential surface of the spindle 10 and the inner circumferential surface of the housing, whereby non-contact air sealing is effected. A structure that effects the air sealing will be described with reference to FIG. 2. FIG. 2 is an enlarged view of the AS portion in FIG. 1A. On the outer circumferential surface of the part of the main spindle 10 that is inserted in the housing, on the front side with respect to the bearing J, a first annular groove M1, a second annular groove M2, and a third annular groove M3 are formed in the circumferential direction of the main spindle 10, arranged in parallel in this order from the front side to the rear side (the side opposite to the front side) (in the example shown in FIG. 2, from left to right). In a lower portion of the housing that faces the second annular groove M2, the discharging passage DL for discharging fluid (coolant, etc.) that enters through the gap between the housing and the main spindle 10 is formed (see FIGS. 1A and 1B).

The air sealing member 50 shown in FIG. 2 is disposed at the position such that the air sealing member 50 does not cover the second annular groove M2 and the third annular groove M3 but covers the first annular groove M1, and therefore, the air sealing member 50 is formed relatively small. A first inner-side air receiving groove MA is formed, in the circumferential direction, on part of the inner circumferential surface of the air sealing member 50 that faces the first annular groove M1, and a first outer-side air receiving groove MAA is formed, in the circumferential direction, on part of the outer circumferential surface of the air sealing member 50 that faces the first inner-side air receiving groove MA. The first outer-side air receiving groove MAA and the first inner-side air receiving groove MA are communicated with each other via a plurality of communication holes HA (or a plurality of slits, etc.). It is preferable that the plurality of holes HA (or the slits etc.) be formed at regular intervals all around the perimeter.

The air supply passage AL1 is connected to the outer-side air receiving groove MAA, and the air supplied is filled into an air receiving area AKA that is created by the first outer-side air receiving groove MAA. The escape for the air filled into the air receiving area AKA is the communication holes HA only, and it is possible to make substantially uniform the pressure of the air filled into the air receiving area AKA all around the perimeter by appropriately setting the number and the size of the communication holes HA. In addition, the air filled so that the pressure thereof is made substantially uniform all around the perimeter in the air receiving area AKA passes through the communication holes HA and is introduced into an air receiving area AK1 created by the first inner-side air receiving groove MA and the first annular groove M1 so that the air diffuses substantially uniformly all around the perimeter. In addition, the air introduced into the air receiving area AK1 is discharged through a first air sealing gap AG1 that is defined by an outer circumferential surface of the main spindle 10 on the front side with respect to the first annular groove M1 and an inner circumferential surface of the air sealing member 50 on the front side with respect to the first inner-side air receiving groove MA so that the amount of air discharged is substantially uniform all around the perimeter. Thus, it is possible to achieve the air sealing effect that is substantially uniform all around the perimeter. Similarly, air is discharged through a second air sealing gap AG2 that is defined by an outer circumferential surface of the main spindle 10 on the rear side with respect to the first annular groove M1 and an inner circumferential surface of the air sealing member 50 on the rear side with respect to the first inner-side air receiving groove MA so that the amount of air discharged is substantially uniform all around the perimeter. Thus, it is possible to achieve the air sealing effect that is substantially uniform all around the perimeter.

In the case of the first air sealing gap AG1, air is discharged in the direction from the rear side to the front side, and on the other hand, in the case of the second air sealing gap AG2, air is discharged in the direction from the front side to the rear side. Because coolant, foreign matter, etc. enter through the gap between the housing and the main spindle 10 from the front side thereof, it is preferable that the amount of air discharged through the first air sealing gap AG1 be greater than the amount of air discharged through the second air sealing gap AG2. Thus, the first air sealing gap AG1 and the second air sealing gap AG2 are formed so that the resistance to the discharge of air through the second air sealing gap AG2 is less than the resistance to the discharge of air through the first air sealing gap AG1. For example, the distance between the outer circumferential surface of the main spindle 10 and the inner circumferential surface of the air sealing member 50 of the first air sealing gap AG1 is set substantially equal to the distance between the outer circumferential surface of the main spindle 10 and the inner circumferential surface of the air sealing member 50 of the second air sealing gap AG2. In addition, the first air sealing gap AG1 and the second air sealing gap AG2 are formed so that the length LG2 of the second air sealing gap AG2 in the direction of the rotation axis ZT is smaller than the length LG1 of the first air sealing gap AG1 in the direction of the rotation axis ZT. In this way, it is possible to make the amount of air discharged through the first air sealing gap AG1 greater than the amount of air discharged through the second air sealing gap AG2, thereby improving sealing performance.

In addition, a construction is adopted in which the air supply passages AL1 and AL2 are not connected to each other in the housing, and air is separately supplied to the air supply passage AL1 and the air supply passage AL2 from the air supply source. The air supply passage AL1 is connected to the first annular groove M1 so as to supply air thereto, and the air supply passage AL2 is connected to the third annular groove M3 so as to supply air thereto. In this way, it is possible to allow a stable amount of air to be discharged from the air receiving area AK1 created by the first annular groove M1 and the first inner-side air receiving groove MA and from an air receiving area AK3 created by the third annular groove M3 and an inner-side air receiving groove MC, which functions as the second inner-side air receiving groove. If the air supply passages AL1 and AL2 are connected to each other, when the resistance to the discharge of air through one of the air receiving areas is relatively lower, the amount of air discharged from the one air receiving area increases and the amount of air discharged from the other air receiving area decreases, which is not preferable. A collection space AK2 defined by the second annular groove M2 and an inner-side air receiving groove MB collects the air from the second air sealing gap AG2 and the air from a third air sealing gap AG3 and also collects coolant, foreign matter, etc. that have entered, and the air, coolant, foreign matter, etc. that are collected are discharged through the discharging passage DL.

In the above description, a case has been described where the relatively small air sealing member 50 is disposed at the position such that the air sealing member 50 covers the first annular groove M1 only. However, although the size of the air sealing member 50 is increased a little, a configuration may be adopted in which the dimension of the air sealing member 50 (the length thereof in the direction of the rotation axis ZT) is increased so that the air sealing member 50 covers the first to third annular grooves M1 to M3. In this case, the inner-side air receiving groove MB and the inner-side air receiving groove MC, which functions as the second inner-side air receiving groove, are formed in the air sealing member 50. As in the case of the portion opposite to the first annular groove M1 in the air sealing member 50, an outer-side air receiving groove, which functions as the second outer-side air receiving groove, is formed on the outer circumferential surface opposite to the inner-side air receiving area MC, and the outer-side air receiving groove and the inner-side air receiving groove MC are communicated with each other via a plurality of communication holes or a plurality of slits. Then, the air supply passage AL2 is connected to the outer-side air receiving groove.

The air sealing member 50 is made of cast iron or gunmetal and the main spindle 10 is made of iron. In this way, the material for the air sealing member 50 and the material for the main spindle 10 are different from each other. This reduces the possibility that galling (seizure etc.) occurs when the air sealing member 50 and the main spindle 10 contact each other. It is preferable that the material for the air sealing member 50 have a relatively lower mechanical strength (higher brittleness), because when the main spindle 10 and the air sealing member 50 contact each other due to, for example, the collision between the tool and a workpiece, costs and time needed for replacement are very small in the case where the air sealing member 50, which is a relatively small part, is replaced as compared to the case where the main spindle 10 is replaced.

(Detail of Labyrinth Structure Portion)

Next, a labyrinth structure, providing a labyrinth-like complex space, that is formed in part of the gap between the main spindle 10 and the housing in order to reduce the entrance of coolant, foreign matter, etc. will be described with reference to FIG. 2. On the outer circumferential surface of a protruding portion of the main spindle 10 that protrudes from the housing on the front side, a labyrinth-forming annular groove MR is formed in the circumferential direction of the main spindle 10. In addition, a convex portion 40T of the housing lid member 40 on the inner side thereof is inserted into the labyrinth-forming annular groove MR all around the perimeter along the radial direction of the main spindle 10 so as not to contact the labyrinth-forming annular groove MR, whereby a labyrinth gap AGR that is created between the labyrinth-forming annular groove MR and the convex portion 40T has a labyrinth-like complex form.

As shown in FIG. 2, due to the positional relation between the convex portion 40T of the housing lid member 40 and the labyrinth-forming annular groove MR of the main spindle 10, even a discoid housing lid member 40 provided with a hole, through which the main spindle 10 is inserted, at the center portion thereof cannot be attached to the bearing holding lid member 30 along the rotation axis ZT from the front side to the rear side. Accordingly, the housing lid member 40 is divided into two or more pieces. In this embodiment, the housing lid member 40 is divided into the upper housing lid member 40U and the lower housing lid member 40D at the division line 40a. The upper housing lid member 40U and the lower housing lid member 40D are installed such that the convex portion 40T is inserted into the labyrinth-forming annular groove MR along the direction orthogonal to the rotation axis ZT, and are fixed to the bearing holding lid member 30 by bolts etc.

The rotation axis ZT of the main spindle 10 is the horizontal direction, or a direction inclined by a predetermined angle, which is not equal to zero, with respect to the vertical direction, and the division line 40a of the housing lid member 40 that is constructed so that it is divided into two or more pieces is located in the lower half portion when the housing lid member 40 is divided into upper and lower halves. The division line 40a is set so as to be inclined downward from the radially inner side to the radially outer side of the housing lid member 40. Thus, even when coolant or the like enters at the division line 40a, the coolant entered flows downward and does not reach the gap between the main spindle 10 and the housing.

Figure 3A:
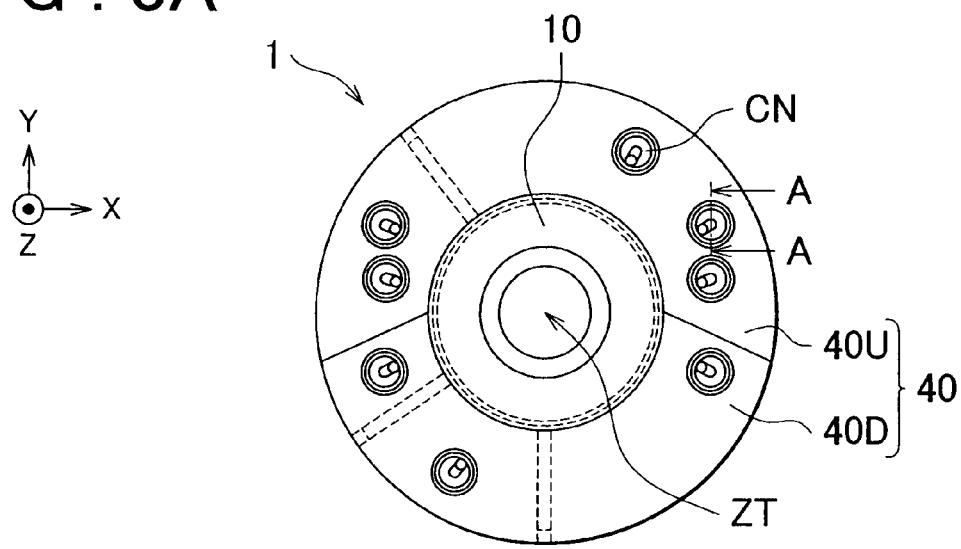
FIG. 3A is a front view for explaining a state where a plurality of coolant nozzles CN are provided in FIG. 1B.
Figure 3B:
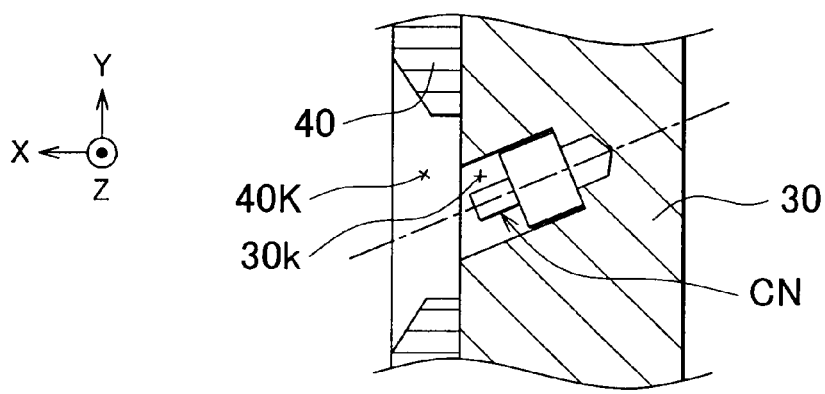
FIG. 3B is an A-A sectional view of FIG. 3A.
Figure 3C:
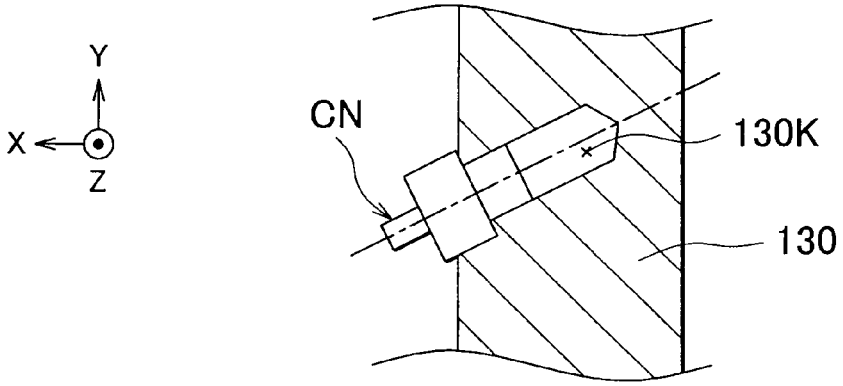
FIG. 3C is a sectional view of related art corresponding to the A-A sectional view of FIG. 3A.
Figure 4A:
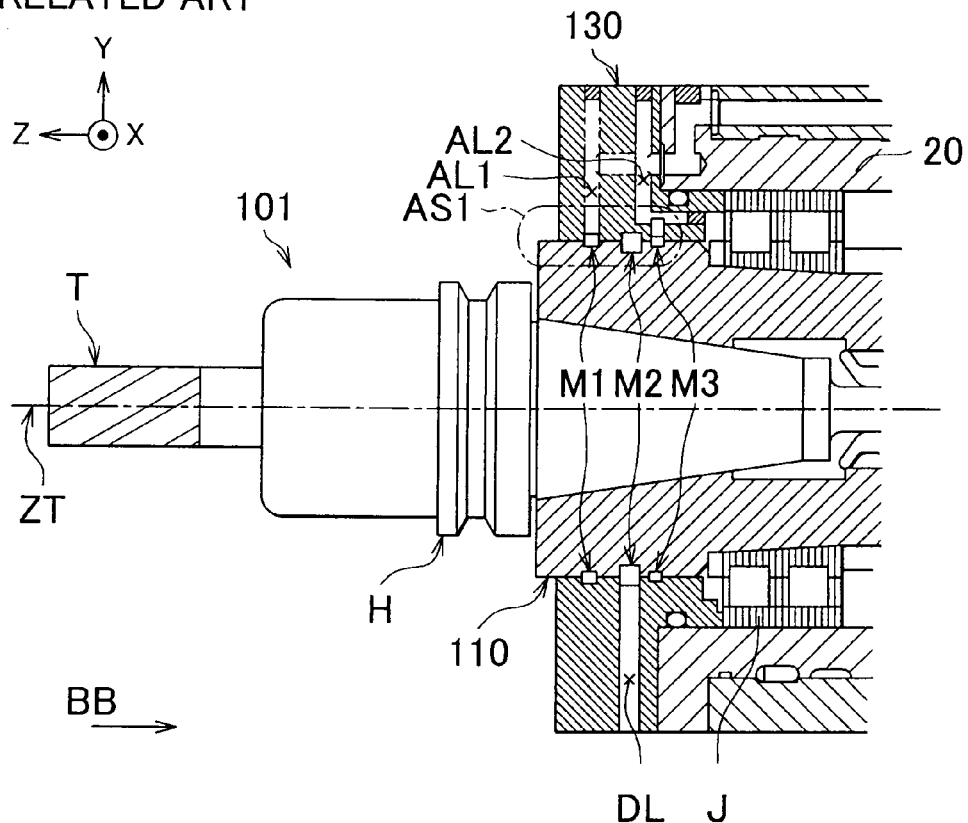
FIG. 4A is a sectional view for explaining a structure of a spindle device 101 of related art.
Figure 4B:
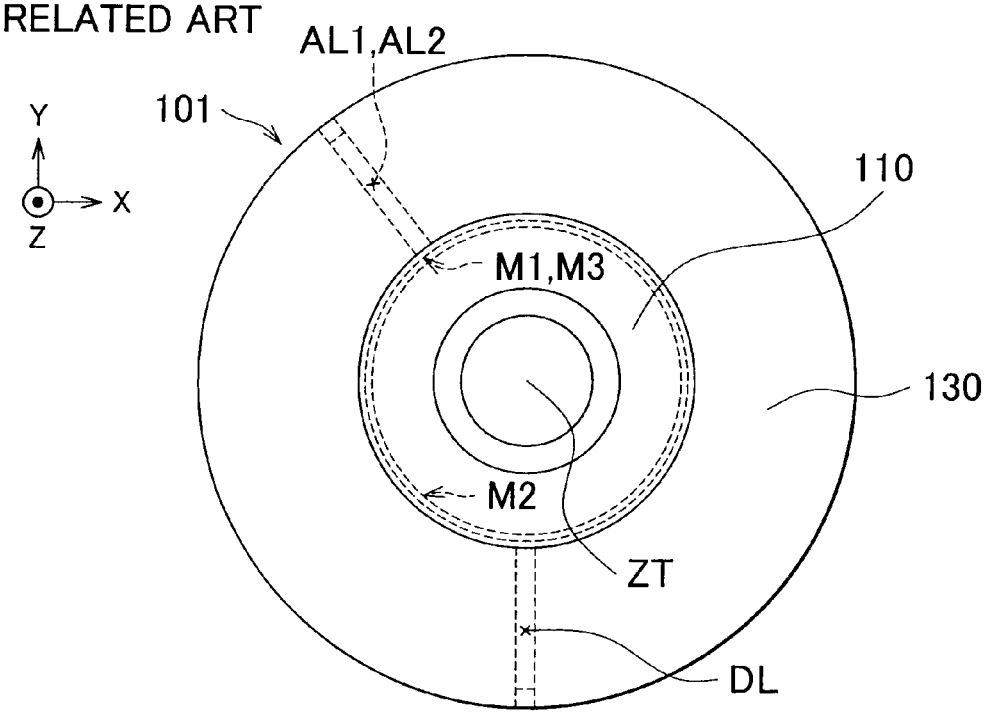
FIG. 4B is a front view for explaining the structure of the spindle device 101 of related art.
Figure 5:
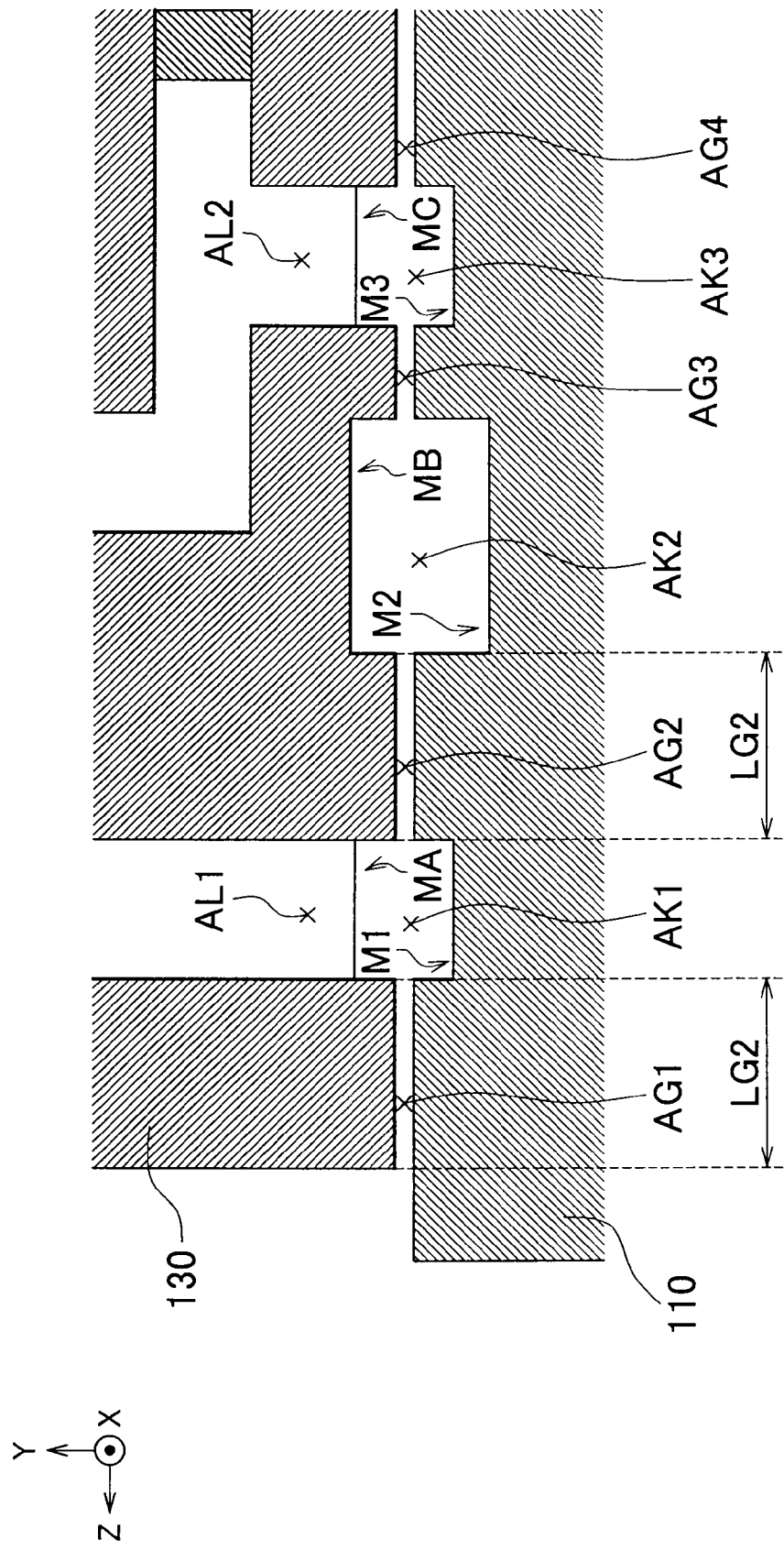
FIG. 5 is an enlarged view of the AS1 portion of the spindle device 101 of related art.

Next, the spray means for spraying coolant will be described with reference to FIGS. 3A to 3C. FIG. 3A shows a main spindle device corresponding to the main spindle device shown in FIG. 1 that includes a plurality of coolant nozzles CN for spraying (discharging) coolant on the front face of the housing. Note that the number of coolant nozzles CN may be one. FIG. 3B shows the A-A cross section of FIG. 3A, showing an example of how the coolant nozzles CN are housed in the case of this embodiment. FIG. 3C shows a conventional manner in which the coolant nozzles CN are housed, for comparison with those shown in FIG. 3B. A plurality of housing holes 30K that house the coolant nozzles so as not for the coolant nozzles to protrude from the housing are formed from the front side toward the rear side in the front end portion of the housing (in this case, the front end portion of the bearing holding lid member 30) that abuts the housing lid member 40. In addition, openings 40K are formed in the housing lid member 40 at the positions corresponding to the housing holes 30K. The axial direction of each of the coolant nozzles CN and the axial direction of each of the housing holes 30K are obliquely directed toward the direction in which coolant is sprayed. As described above, the housing lid member 40 divided into two or more pieces is installed from the direction orthogonal to the rotation axis ZT, and therefore, in order to avoid the interference of the coolant nozzles CN, a design is made so that there is no concave portion (protrusion) on the front end portion of the housing that abuts the housing lid member 40.

With regard to the front view of the main spindle device 1 shown in FIG. 1B (the tool T and the tool holder H are omitted in FIG. 1B), the coolant sprayed onto a tip portion of the tool T, a machined portion of a workpiece W, etc. flies toward various positions at various speeds in various directions. When coolant or the like enters through the gap between the main spindle 10 and the housing (the housing lid member 40 in this case), the entering coolant cannot enter into the further inner area unless it first passes through the labyrinth seal portion having the complex structure provided by the labyrinth-forming annular groove MR and the convex portion 40T. Because the labyrinth seal portion has the complex structure, even the coolant that flies at high speeds in the direction of the rotation axis ZT is reduced in momentum and loses its speed at which the coolant enters, and in addition, is reduced in amount because of dispersion, whereby it is made difficult for such coolant to enter into the further inner area.

On the rear side of the labyrinth seal portion, in a lower portion of the housing, the discharging passage DL2 for discharging fluid, such as coolant, and foreign matter that enter through the gap between the housing and the main spindle 10 is formed (see FIGS. 1A and 1B). In the rear side of the labyrinth seal portion, a collection space AKK that is a space greater in size than the space in the labyrinth gap AGR is created in the circumferential direction of the main spindle 10 all around the periphery. The collection space AKK is defined by an annular groove Mα formed on the inner circumferential surface of the housing lid member 40 in the circumferential direction and an annular groove MK formed on the outer circumferential surface of the main spindle 10 in the circumferential direction (the annular groove Mα is partially formed by the air sealing member 50 in the example shown in FIG. 2). The outer circumferential surface (the bottom of the annular groove MK) of the main spindle 10 facing the collection space AKK is formed as an oblique surface such that the diameter of the main spindle 10 increases from the rear side to the front side. By virtue of the oblique surface, even when coolant or the like enters into the collection space AKK, the coolant entered moves in the upward direction along the oblique surface due to the centrifugal force produced by the rotation of the main spindle 10 (that is, the direction from the rear side to the front side). Thus, the oblique surface provides a structure that makes it difficult for the coolant to enter into the further inner area. The discharging passage DL2 is formed in a lower portion facing the annular groove MK at the interface portion between the housing lid member 40 and the bearing holding lid member 30 (see FIGS. 1A and 1B), and is communicated with the collection space AKK. In the further inner area relative to the collection space AKK, the air sealing gaps AG1 to AG4 described above are disposed, and there is little coolant or the like that passes through all the gaps and reaches the bearing J. Thus, it is possible to properly prevent seizure of the bearing J and to improve the reliability of the main spindle device 1.

The invention is not limited to those having the external appearance, structure, etc. described using the embodiment and various modifications, and addition and removal of element(s) can be made within the scope of the spirit of the invention. In addition, the values used in the description of the embodiment are given by way of example and such values of the invention are not limited to these values.

What is claimed is:

1. A main spindle device comprising:
    a housing;
    a main spindle that is inserted into the housing and supported by a bearing so as to be able to rotate relative to the housing, wherein a labyrinth-forming annular groove is formed, in a circumferential direction of the main spindle, on a protruding portion of the main spindle that protrudes from the housing on a front side along a rotation axis of the main spindle; and
    a housing lid member having a convex portion that is inserted, along a radial direction of the main spindle, into the labyrinth-forming annular groove so as not to contact an inside surface of the labyrinth-forming annular groove all around the periphery, the housing lid member being fixed to the housing on the front side thereof with the convex portion being inserted in the labyrinth-forming annular groove,
    wherein a gap between the convex portion and the labyrinth-forming annular groove forms a labyrinth seal portion, and
    the housing lid member is constructed so that the housing lid member can be divided into at least two pieces with respect to a circumference of the labyrinth-forming annular groove.

2. The main spindle device according to claim 1, wherein the rotation axis of the main spindle is oriented in a horizontal direction or in a direction inclined relative to a vertical direction by a predetermined angle, and
    a division line of the housing lid member that is constructed so that the housing lid member can be divided into at least two pieces, is inclined downward from a radially inner side to a radially outer side of the housing lid member when the housing lid member is fixed to the housing.

3. The main spindle device according to claim 1, wherein a discharging passage that discharges fluid and foreign matter that enter through the gap between the housing and the main spindle is formed in a lower portion of the housing on a rear side of the labyrinth seal portion that is opposite to the front side thereof.

4. The main spindle device according to claim 3, wherein a collection space that is a space greater in size than a gap of the labyrinth seal portion is created along an outer circumferential surface of the main spindle in the rear side of the labyrinth seal portion, wherein the discharging passage is connected to the collection space.

5. The main spindle device according to claim 4, wherein the outer circumferential surface of the main spindle defining the collection space is inclined so that a diameter of the main spindle increases from the rear side to the front side.

6. The main spindle device according to claim 1, further comprising: a coolant nozzle that sprays coolant,
    wherein a housing hole that houses the coolant nozzle so as not for the coolant nozzle to protrude from the housing is formed, corresponding to the coolant nozzle, in a front end portion of the housing, on which the housing lid member fixed to the housing abuts the housing, from the front side toward the rear side, and
    an opening is formed in the housing lid member at a position corresponding to the housing hole.

7. The main spindle device according to claim 1, wherein the housing has an air supply passage therein to which an air supply source is connected;
    a first annular groove, a second annular groove, and a third annular groove are formed, in the circumferential direction of the main spindle, on the outer circumferential surface of the main spindle from the rear side of the labyrinth seal portion to the front side of the bearing, the first to third annular grooves being arranged in parallel in this order from the front side to the rear side in the labyrinth seal portion;
    the first annular groove and the third annular groove are connected to the air supply passage; and
    the main spindle device is provided with a non-contact air sealing portion, in which air supplied through the air supply passage is discharged into an air sealing gap that is defined by the outer circumferential surface of the main spindle on both the front side and the rear side of the first annular groove and by the corresponding inner circumferential surface of the housing that faces the outer circumferential surface of the main spindle and into an air sealing gap that is defined by the outer circumferential surface of the main spindle on both the front side and the rear side of the third annular groove and by the corresponding inner circumferential surface of the housing that faces the outer circumferential surface of the main spindle.

* * * * *